(12) United States Patent
Sampas

(10) Patent No.: US 8,473,748 B2
(45) Date of Patent: Jun. 25, 2013

(54) MOBILE DEVICE-BASED AUTHENTICATION

(76) Inventor: George P. Sampas, Santa Barbara, CA (US)

( * ) Notice: Subject to any disclaimer, the term of this patent is extended or adjusted under 35 U.S.C. 154(b) by 0 days.

(21) Appl. No.: 13/246,676

(22) Filed: Sep. 27, 2011

(65) Prior Publication Data
US 2013/0081119 A1 Mar. 28, 2013

(51) Int. Cl.
G06F 21/00 (2006.01)
(52) U.S. Cl.
USPC .................. 713/186; 726/2; 726/7; 713/182
(58) Field of Classification Search
USPC .................. 726/3–5, 7, 2; 713/156, 186, 182
See application file for complete search history.

(56) References Cited

U.S. PATENT DOCUMENTS

| 7,043,754 | B2 | 5/2006 | Arnouse | |
|---|---|---|---|---|
| 7,523,067 | B1 | 4/2009 | Nakajima | |
| 7,623,970 | B2 | 11/2009 | Kondo et al. | |
| 2003/0163710 | A1* | 8/2003 | Ortiz et al. | 713/186 |
| 2004/0022422 | A1 | 2/2004 | Yamauchi et al. | |
| 2005/0255840 | A1 | 11/2005 | Markham | |
| 2005/0273626 | A1 | 12/2005 | Pearson et al. | |
| 2007/0155418 | A1 | 7/2007 | Shau et al. | |
| 2008/0120707 | A1 | 5/2008 | Ramia | |
| 2008/0222692 | A1* | 9/2008 | Andersson et al. | 726/1 |
| 2008/0271122 | A1 | 10/2008 | Nolan et al. | |
| 2009/0113529 | A1* | 4/2009 | Siegel et al. | 726/5 |
| 2009/0169070 | A1 | 7/2009 | Fadell | |
| 2009/0235339 | A1 | 9/2009 | Mennes et al. | |
| 2010/0191960 | A1 | 7/2010 | Beck et al. | |
| 2011/0214171 | A1* | 9/2011 | Wolfond et al. | 726/7 |
| 2012/0166810 | A1* | 6/2012 | Tao et al. | 713/186 |

* cited by examiner

Primary Examiner — Farid Homayounmehr
Assistant Examiner — Suman Debnath
(74) Attorney, Agent, or Firm — Stetina Brunda Garred & Brucker

(57) ABSTRACT

Mobile device-based authentication is disclosed. A first biometric input corresponding to a first biometric feature of the user is captured on the mobile device. A first set of biometric data is derived from the captured first biometric input. The first set of biometric data is transmitted to a remote authentication server. Thereafter, a secondary authentication instruction is transmitted to the site resource in response. Access to the site resource is permitted based upon a validation of the first set of biometric data, and a second biometric input that is captured on the site resource in response to the secondary authentication instruction received thereon. The first set of biometric data and the second set of biometric data are validated by remote authentication server substantially contemporaneously.

22 Claims, 5 Drawing Sheets

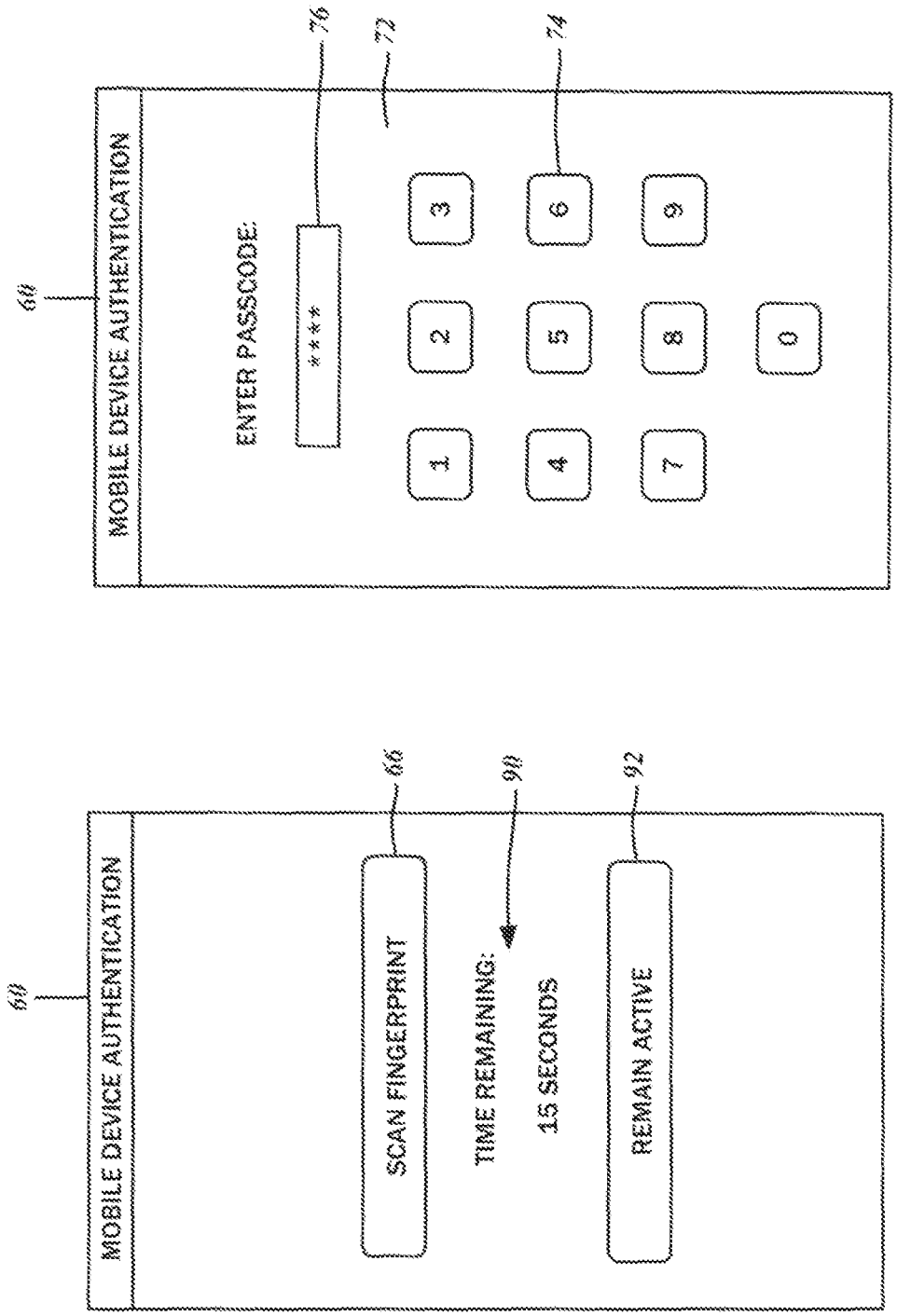

MOBILE DEVICE-BASED AUTHENTICATION

CROSS-REFERENCE TO RELATED APPLICATIONS

STATEMENT RE: FEDERALLY SPONSORED RESEARCH/DEVELOPMENT

Not Applicable

BACKGROUND

1. Technical Field

The present disclosure relates generally to biometric systems and access control, and more particularly, to mobile device-based authentication in connection with secure transactions.

2. Related Art

The recognition of private property interests in general necessarily implicates the division of individuals into those with access, and those without access. Commensurate with the perceived and/or actual values of the property interests, security protocols must be established to ensure that authorized individuals readily have access, while unauthorized individuals are not, no matter what attacks and bypass attempts are made.

In the simplest context, one private property interest may be in a physical facility, and access to the inside may be safeguarded by a keyed mechanical lock on a door. The owner of the physical facility, along with any other individuals granted access thereby, may possess a key that unlocks the mechanical lock to open the door. Any other unauthorized individual who does not have the key will be unable to unlock the mechanical lock. The mechanical lock, of course, may be bypassed in any number of different ways, including picking the lock, destroying the lock and the door altogether, or by pilfering the key from the authorized individuals. To prevent unauthorized access despite such possible bypass attempts, the complexity of the lock may be increased, the strength of the lock and the door may be bolstered, and so forth. Increasingly sophisticated attacks may defeat these further safeguards, so security remains an ever-evolving field.

A property interest may also lie in an individual's bank accounts, credit card accounts, retail installment accounts, utilities accounts, or any other resource that is frequently encountered and used in modern day life, access to which must be properly limited by security systems. In many cases, these resources or property interests can be accessed electronically, and there are conventional security systems and devices that are currently in use. For example, access to monetary funds in a bank account may be possible via an automated teller machine (ATM). Before disbursing any funds, the bank (and hence the ATM) must ensure that the requestor is, indeed, who he asserts to be.

There are a variety of known techniques to authenticate, or verify, the identity of the requestor. Authentication may utilize one or more factors, which include something the requestor knows, something the requestor has, and something the requestor is. Most often, only one, or at most two factors are utilized because of the added cost and complexity of implementing additional authentication factors. In the ATM example, the ATM card with basic accountholder information encoded thereon is one factor (something the requestor has), and access to the account is granted only upon the successful validation of a corresponding personal identification number (PIN, or something the requestor knows). Conventional banking services are also accessible online through the Internet, and while most financial-related web services have additional security measures, access to some other less critical web services may be protected only with an account name and a password constituting a single factor (something the requestor/user knows).

The secret nature of passwords and PINs, at least in theory, is intended to prevent unauthorized access. In practice, this technique is ineffective because the authorized users oftentimes mistakenly and unwittingly reveal their passwords or PINs to an unauthorized user. Furthermore, brute-force techniques involving the entry of every combination of letters, numbers, and symbols, as well as dictionary-based techniques, may further compromise the effectiveness of such authentication systems. Because passwords and PINs must be memorized, users often choose words that are easier to remember, making it more susceptible to defeat by means of dictionary attacks. On the other hand, the more complex the passwords are required to be, and hence more difficult to remember, the more likely that the password will be written on something easily accessible, for both the legitimate and malicious user, in the vicinity of the computer. The usability of the PIN or password is an increasing concern due to the number of services that employ such security modalities.

As briefly mentioned above, various hardware devices may be employed as a second authentication factor. These include simple magnetic strip encoded cards such as the aforementioned ATM card, as well as radio frequency identification (RFID) devices, both of which require specific readers at the point of access. Greater levels of protection are possible with sophisticated tokens that generate unique codes or one-time passwords that are provided in conjunction with a first authentication factor. However, token devices are expensive to license, expensive to maintain, and cumbersome for the user to carry. As with any diminutive device, tokens are easy to lose, especially when it represents yet another addition to the clutter of items that must be managed and carried on the person on a daily basis; many individuals already have enough difficulty keeping track of keys, wallets, and mobile phones.

Acknowledging that the conventional mobile phone is ubiquitous and is kept readily accessible, such devices may also be employed as a second hardware authentication factor. Prior to accessing an online service, a one-time password may be sent to the mobile phone, the number for which is pre-registered with the service, as a Short Message Service (SMS) text message. Access is authorized when the same text message sent to the mobile phone is re-entered to the service.

Much functionality is converging upon the mobile phone, particularly those full-featured variants that have substantial computing resources for accessing the web, run various software applications, and so forth, which are referred to in the art as a smart phone. For instance, credit card payments and the act of physically presenting the physical card itself may be replaced with a software application running on the smart phone. The application may be in communication with a point of sale (POS) terminal via a modality such as Near Field Communication (NFC) or Bluetooth low energy, and transmits credit card payment information, such as credit card number, expiration date, billing ZIP code, and other such verification information. The POS terminal may then complete the payment process with the received information. Domestically, services such as Google Wallet are in existence and progressing toward widespread deployment. Besides NFC and Bluetooth low energy, it is possible to utilize RFID (Radio Frequency Identification) type devices that are encoded with the aforementioned data.

As an additional authentication measure, a third factor utilizes unique biometric attributes of a person such as fingerprints, retinal and facial patterns, voice characteristics, and handwriting patterns. Although prior biometric systems were challenging to implement because of the high costs associated with accurate reader devices and database systems for storing and quickly retrieving enrollment data, the increasing demand for biometrics-based security has resulted in the development of substantially improved reader devices, and user interfaces and back-end systems therefor. Currently there are fingerprint reader peripheral devices that are connective to a Universal Serial Bus (USB) port on personal computer system, and restrict access without providing a valid, enrolled fingerprint. Mobile devices may also be incorporated with biometric readers, and front-facing video cameras such as those already existing in smart phones such as the Apple iPhone may be utilized for facial recognition.

As noted above, there are divergent proposals for solving the issue of authenticating a user of remote service resources and ensuring that the user is, indeed, who he asserts he is. Thus there is a need in the art for an improved mobile device-based authentication in connection with secure transactions.

BRIEF SUMMARY

In accordance with one embodiment of the present disclosure, a method of authenticating a user to a site resource is contemplated. The method may begin with capturing a first biometric input from the user on an integrated first biometric reader on a mobile device. The first biometric input may correspond to a first biometric feature of the user. There may also be a step of deriving a first set of biometric data from the captured first biometric input. The method may also include transmitting the first set of biometric data to a remote authentication server from the mobile device. Additionally, the method may include a step of transmitting a secondary authentication instruction to the site resource in response to receipt of the first biometric input. There may be a step of capturing a second biometric input from the user on a second biometric reader connected to the site resource in response to the secondary authentication instruction. The second biometric input may correspond to a second biometric feature of the user. The method may further include deriving a second set of biometric data from the captured second biometric input. Furthermore, the method may include transmitting the second set of biometric data to the remote authentication server from the site resource. There may be a step of authenticating the user for access to the site resource based upon a validation of the first set of biometric data and the second set of biometric data against a pre-enrolled set of biometric data for the user stored on the remote authentication server. The first set of biometric data and the second set of biometric data may be transmitted to the remote authentication server substantially contemporaneously, and validated for a successful authentication.

According to another embodiment of the present disclosure, there is contemplated a method of authenticating a user to a site resource with a mobile device. The method may include capturing a first biometric input from the user on the mobile device. The first biometric input may correspond to a first biometric feature of the user. There may be a step of deriving a first set of biometric data from the captured first biometric input, along with a step of transmitting the first set of biometric data to a remote authentication server from the mobile device. The method may also include transmitting a secondary authentication instruction to the site resource in response to receipt of the first biometric input. Access to the site resource may be permitted based upon a validation by the remote authentication server of the first set of biometric data transmitted from the mobile device. The validation may also encompass a second biometric input of a second biometric feature of the user captured on the site resource. The second biometric input may be captured in response to the secondary authentication instruction received thereon, and transmitted to the remote authentication server as a corresponding second set of biometric data. For a successful authentication, the transmission of the first set of biometric data and the second set of biometric data are validated and/or transmitted to the remote authentication server substantially contemporaneously.

The various aspects of the invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 4A, 4B and 4C show an exemplary user interface for a software application running on the mobile device for authenticating the user to the site resource in various states.

Common reference numerals are used throughout the drawings and the detailed description to indicate the same elements.

DETAILED DESCRIPTION

The detailed description set forth below in connection with the appended drawings is intended as a description of the presently contemplated embodiments of mobile device-based authentication, and is not intended to represent the only form in which the disclosed invention may be developed or utilized. The description sets forth the various functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
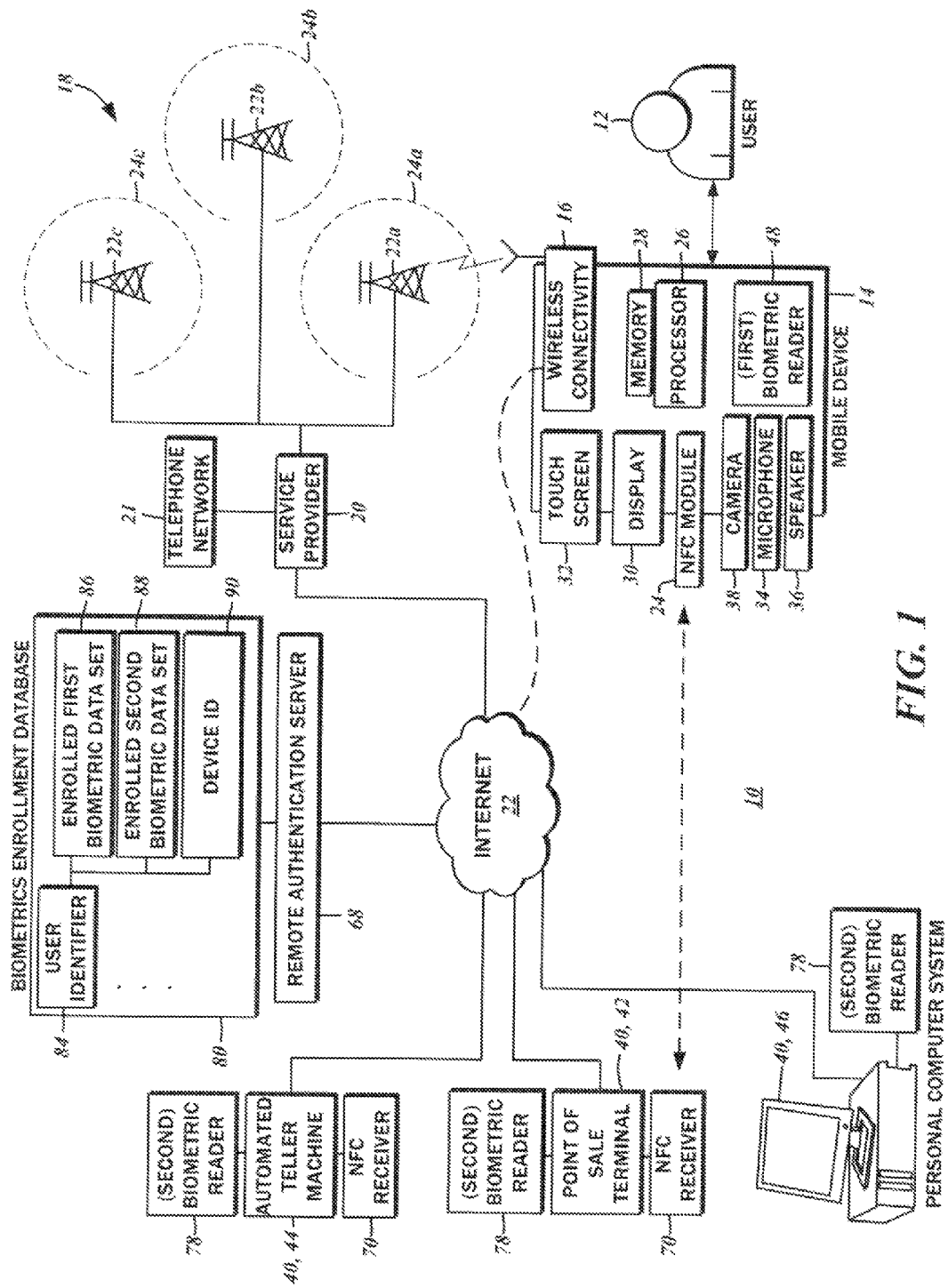
FIG. 1 is a block diagram illustrating an exemplary environment in which embodiments of the present disclosure may be implemented.

The block diagram of FIG. 1 depicts one exemplary environment 10 in which various embodiments of the present disclosure may be implemented. A user 12 is in physical possession of a mobile device 14 that has various data processing and communications features as will be detailed more fully below. The mobile device 14 is a smart phone type apparatus that has a wireless network connectivity module 16 for placing telephone calls over a mobile telecommunications network 18 managed by a service provider 20, among other functions. The service provider 20 is understood to be connected to a greater telephone network 21. Currently several competing communication protocols, standards, and technologies such as CDMA2000. EDGE, UMTS, and so forth are deployed, depending on the service provider 20. As will be recognized by those having ordinary skill in the art, the wireless network connectivity module 16 includes components such as the RF (radio frequency) transceiver, the RF modulator/demodulator, the RF front end module, one or more antennas, digital/analog converters, among other minor components as implemented in conventional communications devices. As will also be recognized, the relatively short range of wireless transmissions between the mobile device 14, there are multiple antenna towers 22a-c, for example, that provide coverage for separate geographic areas 24a-c, respectively. The operational principles of the telecommunications network 18 in conjunction with the wireless network connectivity module 16 are well known in the art, and to the extent any specifics are described, it is by way of example only and not of limitation.

The wireless network connectivity module 16 may also be utilized for data communications besides voice telephone calls. In this regard, the service provider 20 may also have a link to the Internet 23, the utility for which will become more apparent below. Aside from utilizing the mobile telecommunications network 18, the wireless network connectivity module 16 may be configured for Wi-Fi (IEEE 802.11x), Bluetooth, and the like. One data communications modality that is also understood to be incorporated into the mobile device 14 is Near Field Communication (NFC), which facilitates simple data transfers between closely positioned transceivers. Although some implementations may involve the integration of NFC functionality into the wireless network connectivity module 16 and reusing the same sub-components, the embodiment shown in FIG. 1 contemplates a separate NFC module 24.

Among other functions, the higher level data transfer link management functions are handled by a general purpose data processor 26. In particular, the general purpose data processor 26 executes programmed instructions that are stored in a memory 28. These tangibly embodied instructions, when executed may perform the contemplated method of authenticating the user 12 with the mobile device 14. Additionally, the mobile device 14 may have stored thereon programmed instructions that comprise software applications that provide functionality in addition to making and receiving telephone calls, such as simple message service (SMS) text messaging, e-mail, calendars/to-do, photography, videography, media playback, and web browsing, among many others. Some advanced mobile devices 14 may have a dedicated graphics processor and other enhancements that accelerate performance, though for purposes of the present disclosure and the mobile device 14, such components are understood to be subsumed within the term, general purpose data processor 26.

The results of the computation performed by the general purpose data processor 26, and in particular the user interface for the applications, is displayed or output to a screen 30. Commonly, the screen 30 is a liquid crystal display (LCD) device of varying dimensions fitted to the housing of the mobile device 14. Inputs for the computation and other instructions to the application are provided via a touch input panel 32 that may be overlaid on the screen 30. In some implementations, the screen 30 and the touch input panel 32 are integrated, however. Besides the touch input panel 32, there may be alternative input modalities such as a keypad. The arrangement of the keys may be different to fit within the dimensions of the mobile device 14. Along these lines, other input/output devices such as a microphone 34 for receiving audio or voice signals is included, as well as a speaker 36 for outputting audio. For providing visual data to the mobile device 14, there may be an integrated camera 38 comprised of a lens, an imaging sensor, and a dedicated image processor connected to the general purpose data processor 26. The camera 38 may be utilized to capture still images as well as a video stream, the data for which is stored on the memory 28. Additional uses for the camera 38 are contemplated in accordance with various embodiments of the present disclosure, the details of which will be described more fully below.

There are numerous variations of the mobile device 14 or smart phone that are currently available on the market. Some notable ones include the iPhone from Apple, Inc. and the DROID from Motorola, Inc. It is also contemplated that various embodiments of the present disclosure may be implemented on mobile devices 14 besides smart phones or cellular phones, such as tablet-type devices including the iPad from Apple, Inc., full features media player devices including the iPod again from Apple, Inc., and other portable digital assistant-type devices. The specifics of the mobile device 14 are presented by way of example only and not of limitation, and any other suitable mobile device 14 may be substituted.

Broadly, one aspect of the present disclosure contemplates the use of the mobile device 14 to authenticate the user 12 for access to a site resource 40. In one example illustrated in the block diagram of FIG. 1, the site resource 40 is a point of sale (POS) terminal 42 and its associated components. In another example, the site resource 40 is an automated teller machine (ATM), and in yet another example, the site resource 40 is a personal computer system 46. In each of these examples, the site resource 40 is protected from unauthorized access, and the disclosed method for authenticating the user 12 may be utilized to permit access. Accordingly, as referenced herein, the site resource 40 is understood to encompass any access-limited system, including physical facilities, financial accounts, and so forth. The following description will be in the context of the POS terminal 42, but one of ordinary skill in the art will readily recognize the applicability or non-applicability and necessary substitutions for various disclosed features to implement the contemplated mobile device-based authentication in other contexts.

Figure 2:
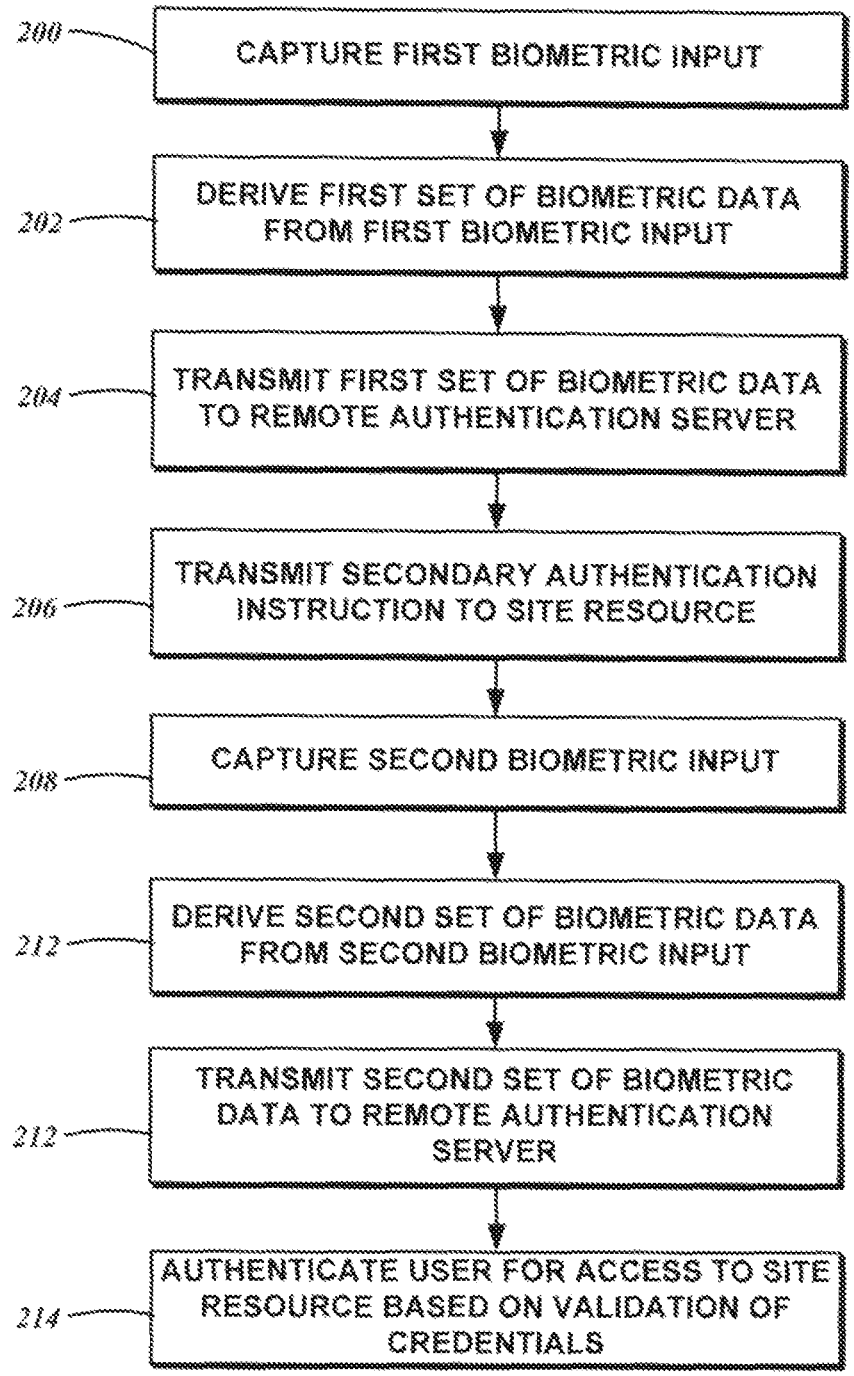
FIG. 2 is a flowchart illustrating one embodiment of the contemplated method for authenticating a user to a site resource.
Figure 3:
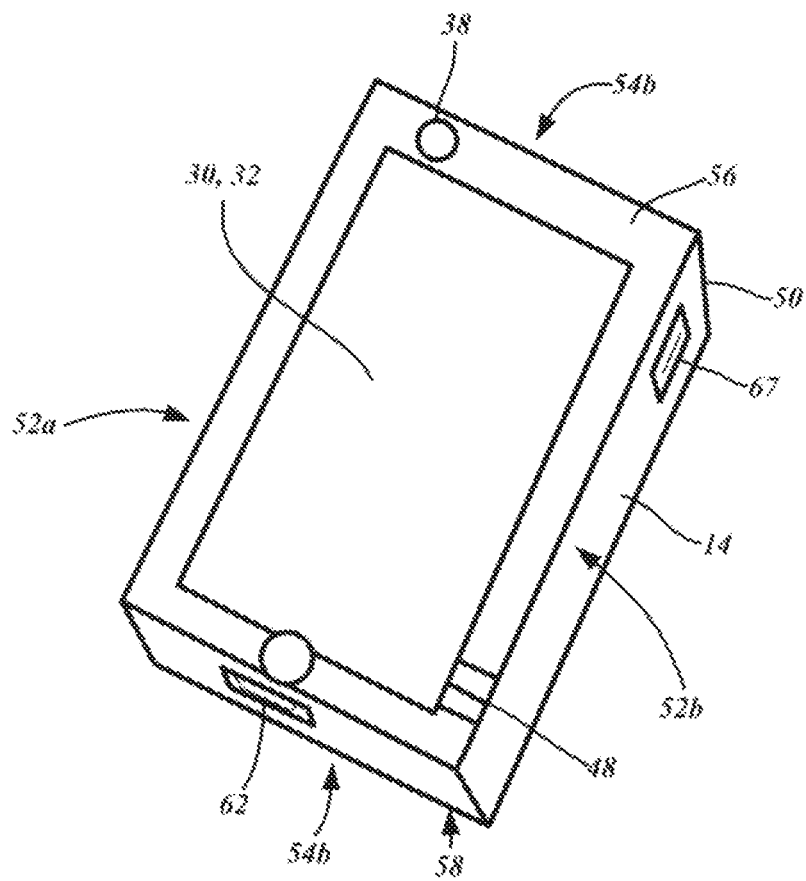
FIG. 3 is a perspective view of a first embodiment of a mobile device which may be utilized in connection with the present disclosure including a fingerprint reader and a front-facing camera.

With additional reference to the flowchart of FIG. 2, the method of authenticating the user 12 begins with a step 200 of capturing a first biometric input from the user 12 on an integrated first biometric reader 48 on the mobile device 14. As shown in FIG. 3, the mobile device 14 is understood to include a case 50 defined by opposed left and right sides 52a, 52b, respectively, opposed top and bottom sides 54a, 54b, a front face 56 on which the screen 30 and the touch input panel 32 is disposed and is coplanar therewith, and an opposite rear face 58. The biometric reader 48 may also be disposed on the front face 56, though this is merely exemplary. The biometric reader 48 may alternatively be disposed on any of the sides 52, 54, or the rear face 58. Those having ordinary skill in the art will be capable of optimizing the position of the biometric reader 48 in accordance with the ergonomic needs of the user 12. As an alternative to the integrated biometric reader 48, it is also possible to attach an external variant via an external data communication port 62 typically included with the mobile device 14.

In one embodiment, the biometric reader 48 is a fingerprint sensor, and so the aforementioned first biometric input from the user 12 is the finger, or more specifically, the fingerprint. The fingerprint sensor can be, for example, an optical sensor, an ultrasonic sensor, a passive capacitance sensor, or an active capacitance sensor. It is also contemplated that the touch screen 32 may have sufficient resolution to not only detect touch input, but also to detect individual ridges and valleys of a fingerprint. In such embodiments, the biometric reader 48 is understood to be incorporated into or part of the touch screen 32. Instead of the fingerprint sensor, an imaging device such as the on-board camera 38, with sufficient macro focus capabilities, may be utilized to capture an image of the fingerprint. It will be appreciated that any other type of sensor technology known in the art or otherwise can capture characteristics of a person's fingerprint can also be utilized.

Implementation of other types of biometrics and corresponding biometric readers in the mobile device 14 are also expressly contemplated. For instance, facial recognition and iris pattern recognition using a forward-facing camera 38 on the front face 56 of the case 50 may be possible. Additionally, the voice of the user 12 as recorded by the microphone 34 may also be utilized as the first biometric input. Although the features of the mobile device-based authentication will be described in the context of scanning fingerprints, it will be understood that any such other biometrics may be substituted. Thus, the user 12 who may not necessarily have intact fingers or clear fingerprints may also utilize the disclosed mobile device-based authentication.

The capture of the first biometric input may be initiated by specifying the same to a dedicated application running on the mobile device 14. With reference to an exemplary user interface 60 of the application shown in FIG. 4A, there may be an activatable button 66 that can be "pressed" by the user 12 with the appropriate, pre-designated finger positioned on the biometric reader 48. Instead of an application interface-based button 66, the mobile device 14 may have an externally accessible hardware button 67. As the biometric reader 48 acquires the image of the fingerprint, an indicator may be displayed on the user interface 60, or the button 66 may be rendered in a subdued color to represent that no other function can be invoked at the same time. The fingerprint is to be compared against an existing fingerprint stored remotely, so the specific finger (thumb, index, middle, ring, little) that is scanned is the same as that stored. To enforce the scanning of the proper finger, the user interface 60 may include directions to this effect.

Before displaying the activatable button 66 for initiating the capture of the biometric input, an optional passcode entry dialog 72 as shown in FIG. 4B may be displayed. In further detail, the passcode entry dialog 72 may include activatable numerical buttons 74 that can be pressed to input a passcode. The corresponding digits, which may be masked, may be displayed in a text box 76. The inputted passcode is compared to a preset passcode, and only when the two matches is access to the button 66 permitted.

Figure 4C:
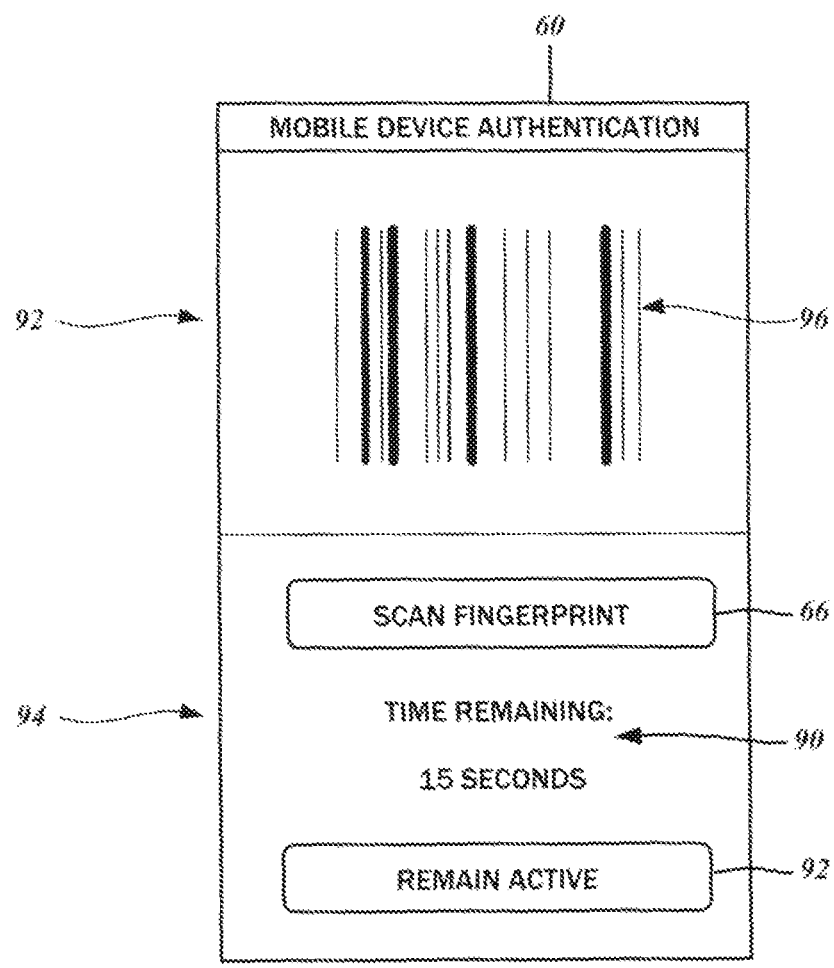

As shown in FIG. 4C, the application interface may be also be segregated into an upper section 92 and a lower section 94, with the button 66 being located in the lower section 94. The upper section 92 may display a barcode 96, a QR code, or other machine readable graphical element for providing payment or discount information to a conventional reader without NFC capabilities. Along these lines, e-commerce applications such as those available from Groupon and the like may be incorporated with the foregoing biometric input features of the present disclosure.

Referring again to the flowchart of FIG. 2, the method continues with a step 202 of deriving a first set of biometric data from the captured first biometric input. In many embodiments of the fingerprint scanner, an image of the fingerprint is generated and stored in the memory 28. Because comparison of the raw fingerprint image is computationally intensive and requires a substantial amount of processing power and memory, select highlights of pertinent points is derived. A much smaller dataset representative of the fingerprint is generated, and can be used as a basis for further comparison. Depending on security requirements and the degree of false positives or negatives acceptable, the number of elements in the first set of biometric data can be modified commensurately.

The method then proceeds to a step 204 of transmitting the first set of biometric data to a remote authentication server 68, which is connected to the Internet 23. As indicated above, the mobile device 14 is also connected to the Internet 23 at least via the service provider 20. Other modalities by which a data communications link between the mobile device 14 and the Internet 23 can be established are also contemplated. Together with the first set of biometric data, other identifying information such as a mobile device identifier number and an authentication server login account may be transmitted to the remote authentication server 68. Due to the sensitivity of this information, the data communications link between the mobile device 14 and the remote authentication server 68 may be secured and encrypted to minimize the vulnerabilities associated with plaintext attack vectors.

Sometime after capturing the first biometric input and deriving the first set of biometric data therefrom, the mobile device 14 may be placed in close proximity to an NFC receiver 70 that is connected to the site resource 40. The use of NFC herein is presented by way of example only, and other competing technologies such as Bluetooth low power may also be utilized. Furthermore, although the use of these wireless data transfer modalities is contemplated for most implementations, there are situations where hardwire transfers are appropriate as well. For example, when communicating the with personal computer system 46, the more likely available modality is a wired link with the mobile device 14. When within the operational transmission distance, or when otherwise ready to initiate a transmission, a secondary authentication instruction is transmitted to the site resource 40 in accordance with a step 206. The secondary authentication instruction can therefore be said to be transmitted to the site resource 40 ultimately in response to the receipt of the first biometric input. In some embodiments, the aforementioned step 204 may be omitted, that is, the first set of biometric data may be transmitted to the NFC receiver 70 instead of to the remote authentication server 68. The first set of biometric data will eventually reach the remote authentication server 68, albeit not directly from the mobile device 14. Along these lines, while the various steps of the method are described in a certain sequence, those having ordinary skill in the art will appreciate that some steps may take place before others, and that the order is exemplary only.

Next, according to step 208, the method may include capturing a second biometric input from the user 12 on a second biometric reader 78 within a set time period following the receipt of the secondary authentication instruction. Again, a second set of biometric data is derived from the captured second biometric input in accordance with a step 210. Like the first biometric reader 48, the second biometric reader 78 may be any one of the more specific examples described above, such as fingerprint readers, cameras, and so on.

The second biometric input is understood to correspond to a second biometric feature of the user 12. There may be implementations and configurations in which the first biometric feature is the same as the second biometric feature. For example, the left thumb may be read by both the first biometric reader 48 as well as the second biometric reader 78. Preferably, however, the first biometric feature will be different from the second biometric feature to decrease the likelihood of successful attacks. In another example illustrating this aspect, the first biometric feature may be the right thumb, while the second biometric feature may be the left index finger. This variation also contemplates the possibility of both of the hands of the user 12 being engaged to biometric readers concurrently, though the other variation is possible where a reasonable delay between inputs are permitted before timing out.

In accordance with step 212, the method continues with transmitting the second set of biometric data to the remote authentication server 68 from the site resource 40. Now, with both the first set and the second set of biometric data as provided to the mobile device 14 and the site resource 40, respectively, per step 214, the user 12 is authenticated for access to the site resource 40. More particularly, the first set and second set of biometric data is validated against a pre-enrolled set of biometric data for the user 12.

As shown in the block diagram of FIG. 1, the remote authentication server 68 includes a biometrics enrollment database 80 that stores records 82 of each user 12 registered or enrolled therewith. Each record 82 may include a user identifier 84, an enrolled first biometric data set 86 and an enrolled second biometric data set 88. Previously, it was noted that the captured biometric input corresponded to a biometric feature of the user 12, with a reference or enrolled set being stored on the remote authentication server 68 for comparison and validation purposes. In the illustrated example, the first biometric feature was the right thumb, while the second biometric feature was the left index finger. Previously scanned versions of the biometric feature, and/or the corresponding set of biometric data is understood to be the aforementioned enrolled first biometric data set 86 and the enrolled second biometric data set 88. In addition to the foregoing, the record 82 may have other information such as a device identifier 90 that is unique to the mobile device 14, such as an SSN (Subscriber Identity Module Serial Number), IMSI (International Mobile Subscriber Identifier), Wi-Fi MAC (Media Access Controller) number, and the like that further validate the mobile device 14 and by implication, the user 12 thereof.

As will be recognized by those having ordinary skill in the art, the enrollment of the biometric data may be achieved in any number of conventional ways. For example, upon initial purchase of the mobile device 14, the user 12 may be requested to go complete an enrollment procedure in which multiple biometric inputs from the user 12 are captured and uploaded to the remote authentication server 68.

If it is determined that the pre-enrolled set of biometric data is matched to the received first set of biometric (from the mobile device 14) and the second set of biometric data (from the second biometric reader 78 connected to the site resource 40), then the user 12 is determined to be valid, and is permitted to utilize the site resource 40. The validation of the first biometric data set and the second biometric data set occurs substantially contemporaneously, that is, simultaneously, or at least perceptively simultaneously to the user 12. Of course, certain delays associated with the various data transmissions are expected, so the receipt and validation of the biometric data has a predefined timeout period. Even if there is a successful validation of the second set of biometric data, it the timeout period expires, there is an authentication failure.

A timeout period may also be enforced on the mobile device 14. Referring to FIG. 4A, after the first biometric input is captured, the user interface 60 may display a countdown timer 90. During the countdown, the mobile device 14 is enabled to transmit the secondary authentication instruction to the site resource 40, so long as it is in close proximity to the NFC receiver 70. Upon expiration of the countdown, further data transfers may be blocked unless the first biometric input is re-captured. In one embodiment, the countdown may be fifteen to twenty seconds in length, thought it may be any other suitable duration. The duration of the countdown may be extended, possibly indefinitely, by pressing a remain active button 92 also generated on the user interface 60. This countdown extension may be made either immediately before or after the first biometric input is captured.

For additional security, the remote authentication server 68 may refuse to accept the first set of biometric data unless it is determined that the transmission originated from a location known to be geographically local to the site resource 40. One exemplary implementation may employ an identifier of the specific antenna tower 22 appended to the transmission of the first set of biometric data, as each antenna tower 22 has limited geographic coverage. Another implementation may involve the retrieval of Global Positioning Satellite (GPS) coordinates from the mobile device 14, and correlating it to the known geographic location of the site resource 40. This location data may be provided to the authentication server 68 upon installation of the site resource 40, or may be transmitted together with the second set of biometric data while in use. It is understood that any transmission modality may be utilized, including hard wired and wireless connections. Those having ordinary skill in the art will recognize other possible location-based restrictions for the authentication procedure.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method of authenticating a user to a site resource, comprising:

capturing a first biometric input from the user on an integrated first biometric reader on a mobile device, the first biometric input corresponding to a first biometric feature of the user;

deriving a first set of biometric data from the captured first biometric input;

transmitting the first set of biometric data to a remote authentication server from the mobile device;

transmitting a secondary authentication instruction to the site resource directly from the mobile device in response to receipt of the first biometric input, capturing a second biometric input from the user on a second biometric reader connected to the site resource in response to the secondary authentication instruction, the second biometric input corresponding to a second biometric feature of the user;

deriving a second set of biometric data from the captured second biometric input;

transmitting the second set of biometric data to the remote authentication server from the site resource; and authenticating the user for access to the site resource based upon a concurrent and independent validation of both the first set of biometric data and the second set of biometric data against respective first and second sets of pre-enrolled biometric data for the user stored independently of each other on the remote authentication server;

wherein the first set of biometric data and the second set of biometric data are transmitted to the remote authentication server for validation, the user being successfully authenticated when the first set of biometric data and the second set of biometric data were captured and transmitted within a predefined timeout period and from locations within a predefined proximity to the remote authentication server as independently specified to the remote authentication server.

2. The method of claim 1, wherein the authentication fails upon a time lapse exceeding a predetermined threshold between the transmission and validation of the first set of biometric data and the transmission and validation of the second set of biometric data to the remote authentication server.

3. The method of claim 1, wherein the capturing of the biometric input is in response to an authentication request input from the user on the mobile device.

4. The method of claim 3, wherein the authentication request input is received from the user following a challenge-response sequence.

5. The method of claim 1, wherein the first biometric reader and the second biometric reader are selected from a group consisting of: a fingerprint scanner, an audio microphone, and an imaging camera.

6. The method of claim 1, wherein the site resource is selected from a group consisting of: an automated teller machine (ATM), a point of sale (POS) terminal, and a personal computer system.

7. The method of claim 1, wherein the first biometric feature and the second biometric feature of the user are different.

8. The method of claim 1, wherein the first biometric feature and the second biometric feature of the user are the same.

9. The method of claim 1, wherein the secondary authentication instruction to the site resource is transmitted over the wireless Near Field Communication (NFC) protocol.

10. The method of claim 1, wherein the secondary authentication instruction to the site resource is transmitted over the wireless Bluetooth low power protocol.

11. A method of authenticating a user to a site resource with a mobile device, comprising:
   capturing a first biometric input from the user of the mobile device, the first biometric input corresponding to a first biometric feature of the user;
   deriving a first set of biometric data from the captured first biometric input;
   transmitting the first set of biometric data to a remote authentication server from the mobile device; and
   transmitting a secondary authentication instruction to the site resource directly from the mobile device in response to receipt of the first biometric input,
   wherein access to the site resource is permitted based upon a concurrent and independent validation by the remote authentication server of the first set of biometric data transmitted from the mobile device and a second biometric input of a second biometric feature of the user captured on the second biometric reader of the site resource in response to the secondary authentication instruction received thereon and transmitted to the remote authentication server as a corresponding second set of biometric data, the user being successfully authenticated when the first set of biometric data were captured and transmitted within a predefined timeout period and from locations within a predefined proximity to the remote authentication server as independently specified to the remote authentication server.

12. The method of claim 11, wherein access to the site resource is denied upon a time lapse exceeding a predetermined threshold between the transmission and validation of the first set of biometric data and the transmission and validation of the second set of biometric data to the remote authentication server.

13. The method of claim 1, further comprising: storing the first set of biometric data on the mobile device following capture of the first biometric input.

14. The method of claim 11, wherein the capturing of the biometric input is in response to an authentication request input from the user on the mobile device.

15. The method of claim 14, wherein the authentication request input is received from the user following a challenge-response sequence.

16. The method of claim 11, wherein the first biometric reader and the second biometric reader are selected from a group consisting of: a fingerprint scanner, an audio microphone, and an imaging camera.

17. The method of claim 11, wherein the site resource is selected from a group consisting of: an automated teller machine (ATM), a point of sale (POS) terminal, and a personal computer system.

18. The method of claim 11, wherein the first biometric feature and the second biometric feature of the user are different.

19. The method of claim 11, wherein the first biometric feature and the second biometric feature of the user are the same.

20. The method of claim 11, wherein the secondary authentication instruction to the site resource is transmitted over the wireless Near Field Communication (NFC) protocol.

21. The method of claim 11, wherein the secondary authentication instruction to the site resource is transmitted over the wireless Bluetooth low power protocol.

22. An article of manufacture comprising a non-transitory program storage medium readable by a data processing apparatus, the medium tangible embodying one or more programs of instructions executable by the data processing apparatus to perform a method of authenticating a user to a resource with a mobile device, the method comprising:
   capturing a first biometric input from the user on the mobile device, the first biometric input corresponding to a first biometric feature of the user;
   deriving a first set of biometric data from the captured first biometric input;
   transmitting the first set of biometric data to a remote authentication server from the mobile device; and
   transmitting a secondary authentication instruction to the site resource directly from the mobile device in response to receipt of the first biometric input, the secondary authentication instruction being transmitted without an evaluation of the first set of biometric data;
   wherein access to the site resource is permitted based upon a concurrent and independent validation by the remote authentication server of the first set of biometric data transmitted from the mobile device and a second biometric input of a second biometric feature of the user captured on the second biometric reader of the site resource in response to the secondary authentication instruction received thereon and transmitted to the remote authentication server as a corresponding second set of biometric data, the user being successfully authenticated when the first set of biometric data were captured and transmitted within a predefined timeout period and from locations within a predefined proximity to the remote authentication server as independently specified to the remote authentication server.

* * * * *